United States Patent
Baek et al.

(10) Patent No.: US 12,184,142 B2
(45) Date of Patent: Dec. 31, 2024

(54) 3-PHASE CONNECTOR INTEGRATED STATOR AND ELECTRIC COMPRESSOR INCLUDING THE SAME

(71) Applicant: Hanon Systems, Daejeon (KR)

(72) Inventors: Chan Ho Baek, Daejeon (KR); Sae Bom Kim, Daejeon (KR); Gwang Hoon Song, Daejeon (KR); Hyo Keun Jeon, Daejeon (KR); Suk Jae Chung, Daejeon (KR); Kyung Ah Hong, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 370 days.

(21) Appl. No.: 17/742,016

(22) Filed: May 11, 2022

(65) Prior Publication Data

US 2022/0376581 A1   Nov. 24, 2022

(30) Foreign Application Priority Data

May 21, 2021   (KR) .................. 10-2021-0065338
Dec. 29, 2021   (KR) .................. 10-2021-0190755

(51) Int. Cl.
*H02K 3/52*   (2006.01)
*F25B 31/02*   (2006.01)

(52) U.S. Cl.
CPC .......... *H02K 3/522* (2013.01); *F25B 31/026* (2013.01); *H02K 2203/06* (2013.01)

(58) Field of Classification Search
CPC .... H02K 3/522; H02K 2203/06; H02K 3/521; H02K 3/52; H02K 3/524; H02K 3/525;

(Continued)

(56) References Cited

U.S. PATENT DOCUMENTS

2020/0227971 A1*   7/2020   Ahn et al. ................ H02K 3/28
                                                                310/71

FOREIGN PATENT DOCUMENTS

CN   109586428   *   4/2019   .............. H02K 1/14
CN   112366883 A   *   2/2021   .............. H02K 15/14

(Continued)

OTHER PUBLICATIONS

CN112366883A PE2E translation (Year: 2021).*

(Continued)

*Primary Examiner* — Thomas Truong
(74) *Attorney, Agent, or Firm* — NORTON ROSE FULBRIGHT US LLP

(57) ABSTRACT

The present disclosure relates to a 3-phase connector integrated stator and an electric compressor including the same. The 3-phase connector integrated stator includes: a stator including a plurality of teeth formed to extend from a cylindrical core, insulators coupled to the core and the teeth so as to surround outer sides of the core and the teeth, and coils wound on outer sides of the insulators at the respective teeth; a motor cover coupled to an upper insulator in a central axis direction of the stator and having a connector coupling part protruding upwardly from an upper plate; and a 3-phase connector inserted into and coupled to the connector coupling part of the motor cover and having connection pins connected to 3-phase coils of the stator. Therefore, the 3-phase connector may be easily assembled to the stator, and the connector pins may be easily assembled to the 3-phase connector.

16 Claims, 9 Drawing Sheets

(58) Field of Classification Search
CPC ...... H02K 5/22; H02K 5/225; H02K 2203/09; F25B 31/026
See application file for complete search history.

(56) References Cited

FOREIGN PATENT DOCUMENTS

| CN | 112688461 | * | 4/2021 | ............... H02K 3/50 |
|---|---|---|---|---|
| DE | 112017000703 T5 | * | 10/2018 | ............... H02K 3/28 |
| JP | 2019205341 A | * | 11/2019 | ............... H02K 1/18 |
| KR | 20140036516 A | * | 9/2012 | ............... H02K 5/22 |
| KR | 101422320 B1 | | 7/2014 | |
| KR | 20150080400 A | * | 7/2015 | ............... H02K 1/24 |
| KR | 20180127799 A | * | 11/2018 | ............... H02K 1/04 |

OTHER PUBLICATIONS

KR20180127799A espacenet translation (Year: 2018).*
KR20150080400A espacenet translation (Year: 2015).*
DE 112017000703 T5 espacenet translation (Year: 2018).*
JP 2019205341 A translation by worldwide.espacenet.com (Year: 2019).*
KR 20140036516 A translation by worldwide.espacenet.com (Year: 2012).*
CN112688461 translated by worldwide.espacenet.com (Year: 2021).*
CN109586428 translation by worldwide.espacenet.com (Year: 2019).*

* cited by examiner

3-PHASE CONNECTOR INTEGRATED STATOR AND ELECTRIC COMPRESSOR INCLUDING THE SAME

CROSS-REFERENCE TO RELATED APPLICATIONS

This application claims priority under 35 U.S.C. § 119 to Korean Patent Application No. 10-2021-0065338, filed on May 21, 2021, and Korean Patent Application No. 10-2021-0190755, filed on Dec. 29, 2021, in the Korean Intellectual Property Office, the disclosure of which is incorporated herein by reference in its entirety.

TECHNICAL FIELD

The following disclosure relates to a stator in which a 3-phase connector connected to three phases of the stator and a cover coupled to one side of the stator to protect a coil are configured integrally with each other in an electric compressor of a vehicle, and an electric compressor including the same.

BACKGROUND

Recently, in accordance with a low pollution and high fuel efficiency policy due to problems such as exhaustion of fossil fuels and environmental pollution, hybrid or electric vehicles using both fossil fuels and electricity as driving sources have become prominent, and research into such hybrid or electric vehicles has been actively conducted.

Such hybrid or electric vehicles obtain power for propulsion of the vehicles through electric motors. Accordingly, unlike a mechanical compressor widely used in an existing vehicle air conditioning system, an electric compressor tends to be recently used.

The electric compressor includes an electric motor converting electric energy into mechanical energy and an inverter controlling rotation of the electric motor. Accordingly, an assembly structure and a size of the electric motor have a great influence on an assembly structure of the entire electric compressor.

The electric motor of such an electric compressor is generally configured to include a rotor having a cylindrical shape and a stator surrounding an outer circumference of the rotor and having a coil wound therearound.

FIG. 1 is a perspective view illustrating a stator of an electric motor in an electric compressor according to the related art.

As illustrated in FIG. 1, the electric motor of the electric compressor includes a stator 10 formed in an approximately hollowed cylindrical shape and having a coil wound therein and a rotor (not illustrated) that is disposed inside the stator and rotates. In addition, the stator 10 includes lead wires of the coil extending from an end turn 20 of the coil and a 3-phase connector having three terminals disposed at distal ends of the lead wires in order to receive power of three phases (U, V, and W phases) supplied from an inverter. Here, the 3-phase connector 30 is exposed through an opening formed on one side of a compressor housing when the stator 10 is housed in the compressor housing, and accordingly, terminals 32 included in the 3-phase connector 30 are electrically connected to the inverter installed outside the opening of the housing.

However, the electric compressor according to the related art has a structure in which fixing parts 31 of the 3-phase connector 30 are press-fitted and fixed into grooves 11 of the stator 10, and the stator is coupled and fixed to an inner portion of the compressor housing by hot press-fitting. In this case, a position or an angle of the stator is changed due to a clearance between the compressor housing and the stator in a process of heating the compressor housing, inserting the stator into the compressor housing, and then cooling the compressor housing to fix the stator to the compressor housing. Accordingly, a position of the 3-phase connector is also changed, and thus, it is difficult to assemble a connector pin mounted in a connector pin coupling part formed in the compressor housing to the 3-phase connector. In addition, it is also difficult to assemble and fix the 3-phase connector to the stator by forming separate coupling structures in the 3-phase connector and the stator.

RELATED ART DOCUMENT

Patent Document (Patent Document 1) KR 10-1422320 B1 (registered on Jul. 16, 2014)

SUMMARY

An embodiment of the present disclosure is directed to providing a 3-phase connector integrated stator in which a 3-phase connector is easily assembled and coupled to a stator and connector pins are easily assembled to the 3-phase connector, and an electric compressor including the same.

In one general aspect, a 3-phase connector integrated stator includes: a stator including a plurality of teeth formed to extend from a cylindrical core, insulators coupled to the core and the teeth so as to surround outer sides of the core and the teeth, and coils wound on outer sides of the insulators at the respective teeth; a motor cover coupled to an upper insulator in a central axis direction of the stator and having a connector coupling part protruding upwardly from an upper plate; and a 3-phase connector inserted into and coupled to the connector coupling part of the motor cover and having connection pins connected to 3-phase coils of the stator.

The connector coupling part of the motor cover and the 3-phase connector may be disposed outside the stator in a radial direction.

The connector coupling part of the motor cover may be a plurality of sidewalls formed at two or more places with the 3-phase connector interposed therebetween and each having coupling holes formed to penetrate through both surfaces thereof, and the 3-phase connector may have catching projections formed to be inserted into and caught by the coupling holes.

The motor cover may have a support part formed to protrude in the central axis direction on an opposite side to the connector coupling part, and the support part may be in contact with and be supported by an outer peripheral surface of the stator.

The motor cover may have a guide plate formed to protrude upwardly from an inner end of the upper plate in a radial direction.

The motor cover may have fixing tabs formed to protrude radially outwardly from an upper end of the guide plate in order to fix lead wires of the 3-phase coils.

Through-holes penetrating through the upper and lower surfaces of the upper plate may be formed at positions corresponding to the fixing tabs in the upper plate of the motor cover.

The 3-phase connector may have coil lead wire coupling parts formed in an inner surface thereof in a radial direction, and has connector pin coupling parts formed in an upper surface thereof.

The insulator of the stator may have fixing grooves formed in an upper surface thereof, the motor cover may have fixing projections protruding from a lower surface thereof, and the fixing projections are inserted into and coupled to the fixing grooves.

The fixing grooves may be formed in a shape in which they are connected to an upper surface and an outer side surface in a radial direction at outer peripheral edge of an upper end of the insulator, and the fixing projections may be formed to protrude in a shape in which they correspond to the fixing grooves on an inner side where the upper plate and a peripheral wall of the motor cover meet.

The fixing projection may be formed in a shape in which a width thereof gradually decreases toward a direction in which it is inserted into the fixing groove.

The insulator of the stator may have catching grooves formed in a side surface thereof, the motor cover may have catching projections protruding on a side surface thereof, and the catching projections may be inserted into and coupled to the catching grooves.

Lead holes penetrating through upper and lower surfaces of the upper plate may be formed in the upper plate of the motor cover.

Cable guide walls may be formed to protrude from an inner side surface of the connector coupling part in a radial direction, and end portions of lead wires of the 3-phase coils of the stator may be inserted between the cable guide walls.

In another general aspect, an electric compressor including a 3-phase connector integrated stator includes: the 3-phase connector integrated stator described above; and a housing into which the 3-phase connector integrated stator is inserted and housed.

Guide parts may be formed to protrude radially outwardly from an outer side surface of the motor cover of the 3-phase connector integrated stator, a guide groove which is connected to a housing part and into which the connector coupling part of the motor cover is inserted may be formed in the housing, the housing part being an internal space into which the stator is inserted, and the guide parts may be inserted along and coupled to the guide groove.

The connector coupling part of the motor cover may be disposed to be spaced apart from the guide groove of the housing.

[Detailed Description of Main Elements]

| | |
|---|---|
| 100: stator | |
| 110: core | 120: teeth |
| 130: insulator | 131: fixing groove |
| 132: catching groove | |
| 140: coil | 141: lead wire |
| 200: motor cover | |
| 210: upper plate | 211: through-hole |
| 213: lead hole | 220: peripheral wall |
| 230: guide plate | 231: fixing tab |
| 240: fixing projection | 241: catching projection |
| 250: connector coupling part | 251: coupling hole |
| 252: cable guide wall | |
| 260: support part | 270: guide part |
| 300: 3-phase connector | |
| 310: catching projection part | 320: coil lead wire coupling |
| 330: connector pin coupling part | |
| 400: lower cover | |
| 500: housing | 510: housing part |
| 520: guide groove | |

DETAILED DESCRIPTION OF EMBODIMENTS

Hereinafter, a 3-phase connector integrated stator according to the present invention having the configuration as described above and an electric compressor including the same will be described in detail with reference to the accompanying drawings.

Figure 1:
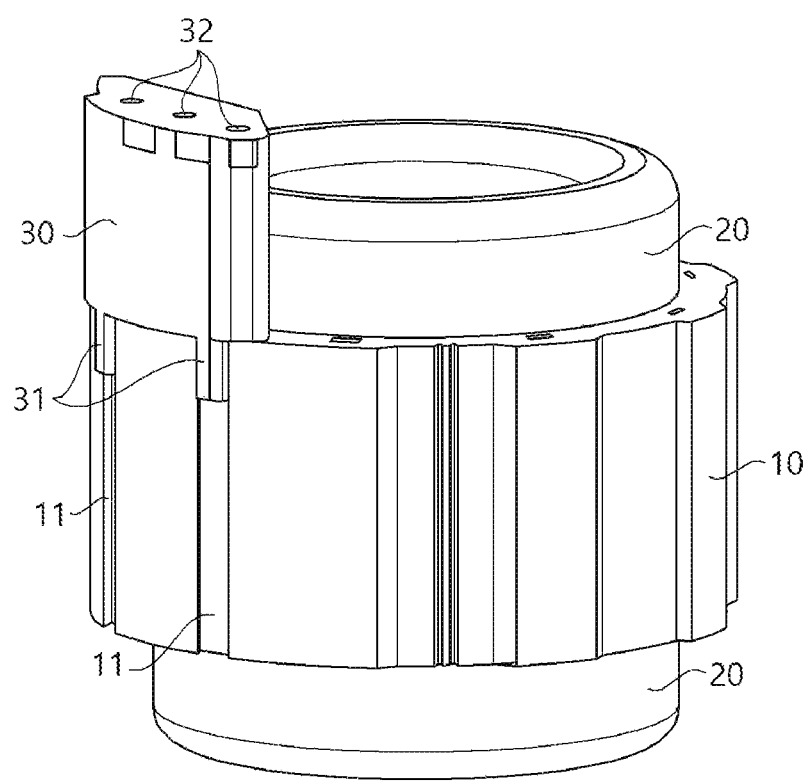
FIG. 1 is a perspective view illustrating a stator of an electric motor in an electric compressor according to the related art.
Figure 2:
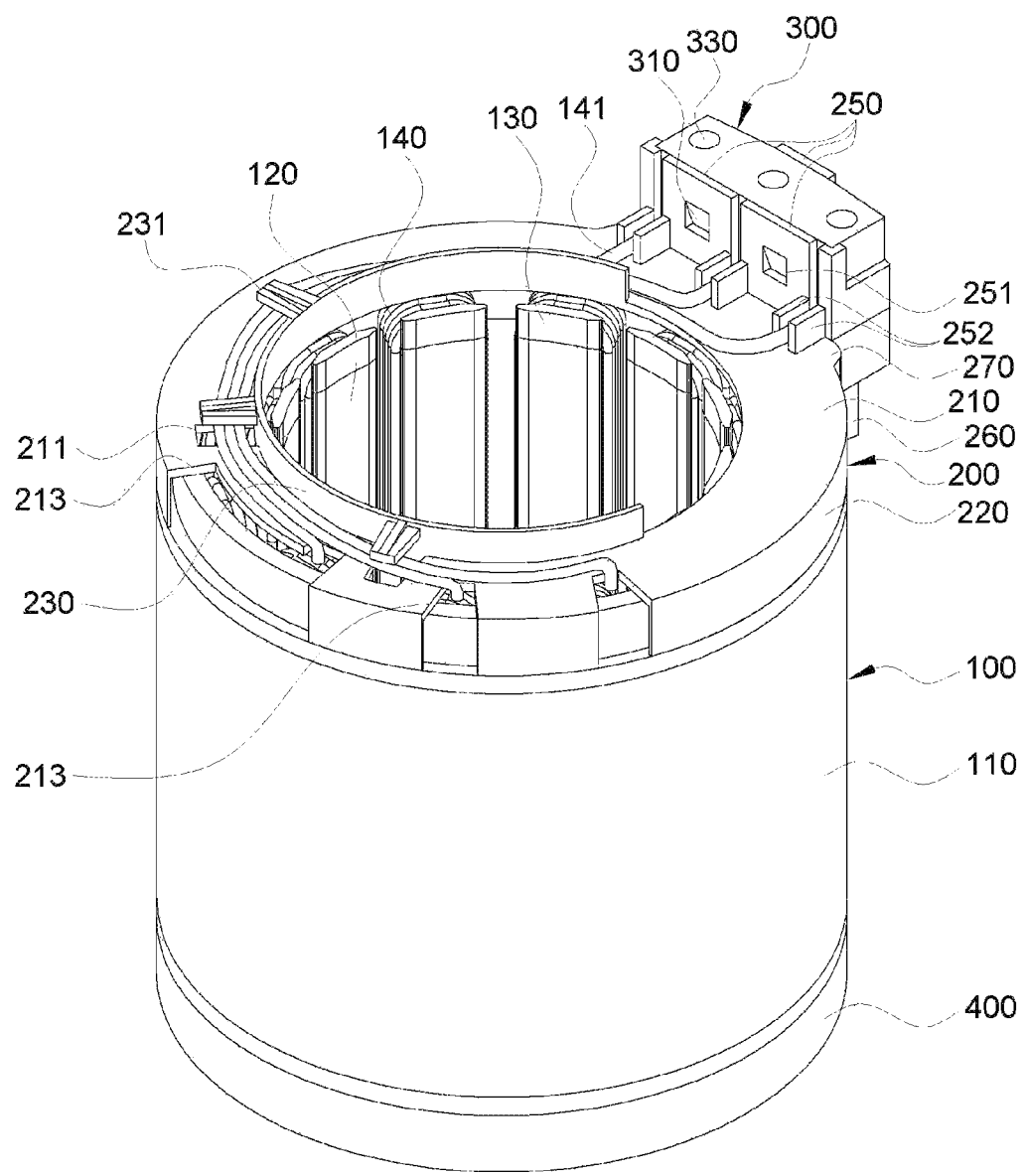
FIGS. 2 to 6 are, respectively, an assembled perspective view, an exploded perspective view, a plan view, a rear view, and a cross-sectional view illustrating a 3-phase connector integrated stator according to an embodiment of the present invention.
Figure 3:
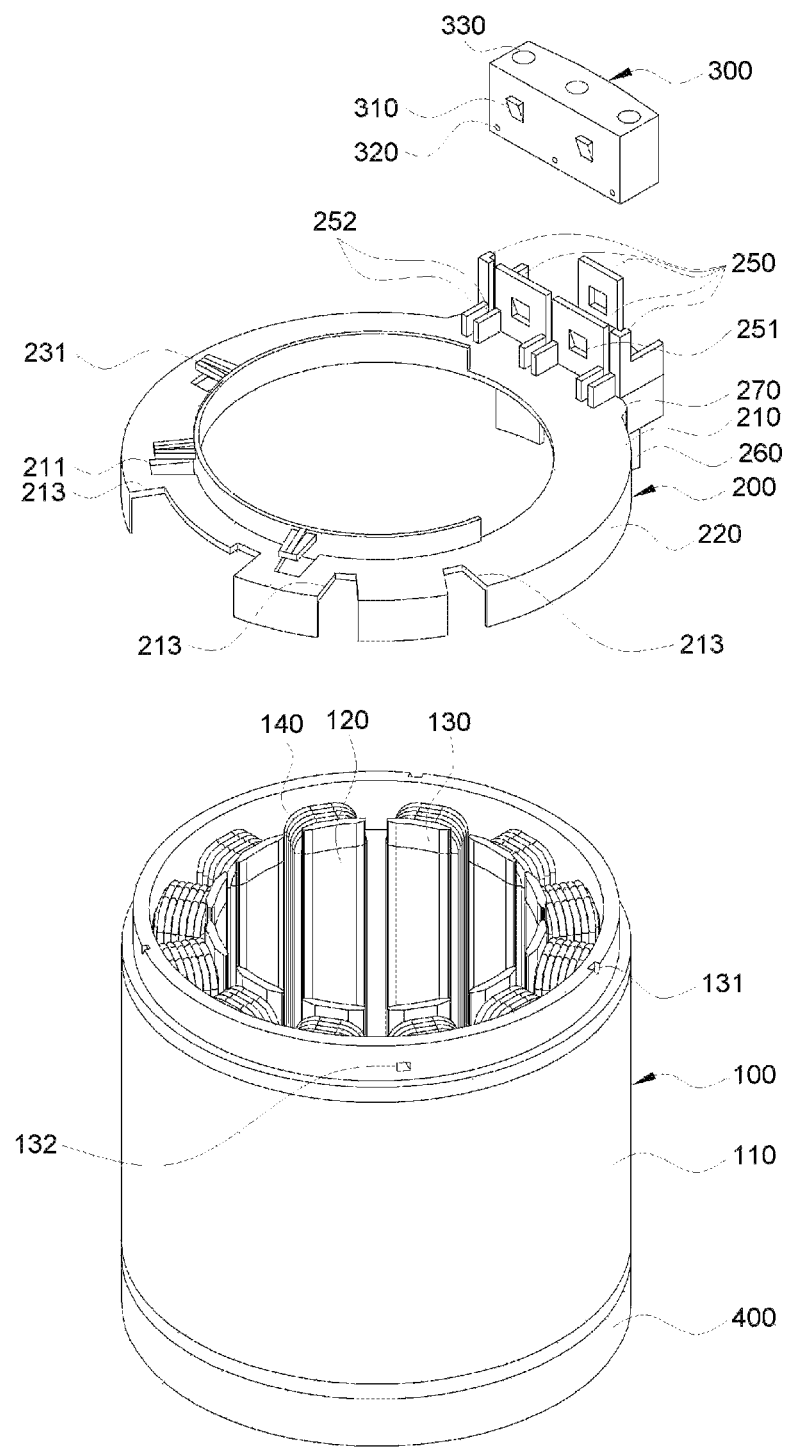
Figure 4:
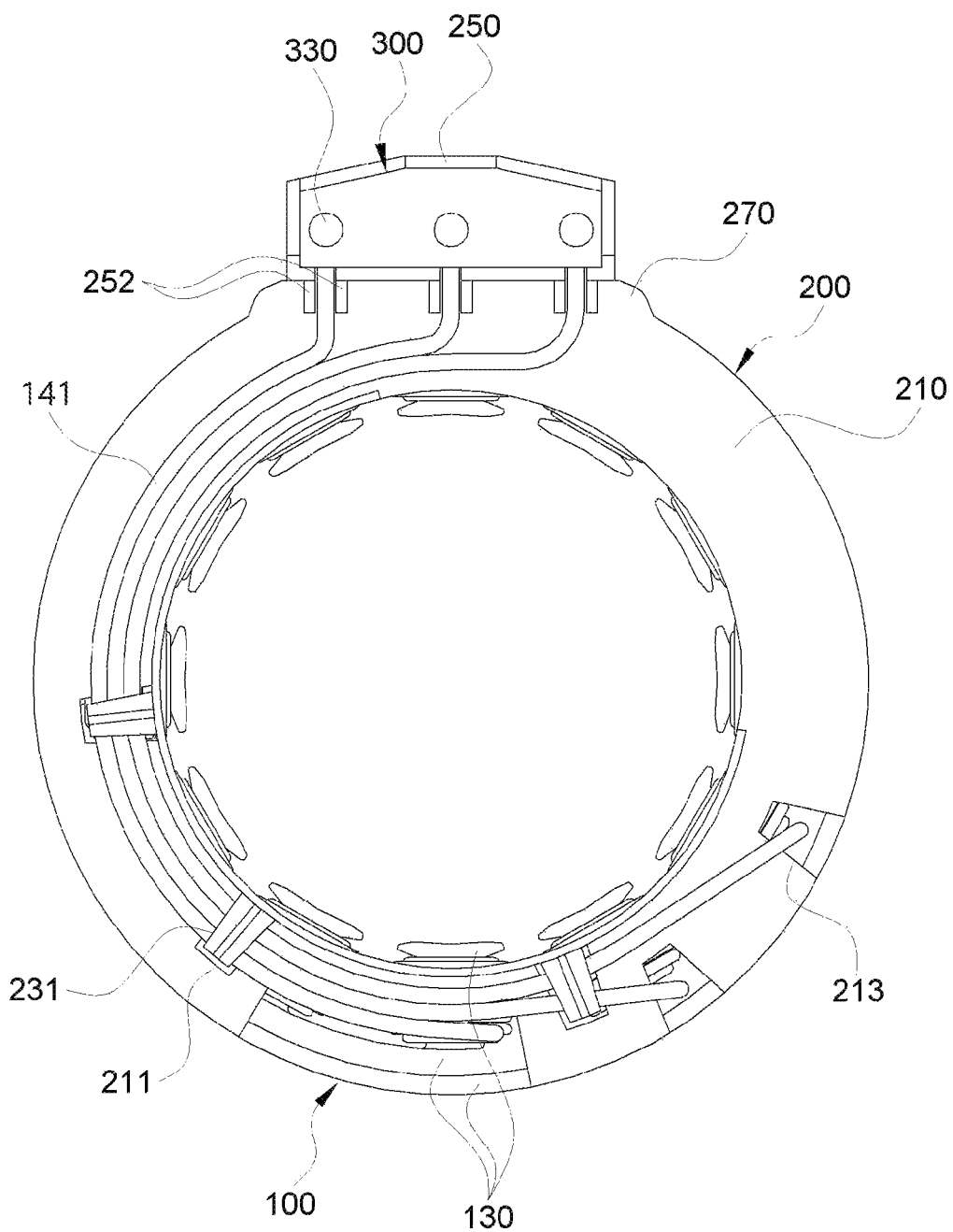
Figure 5:
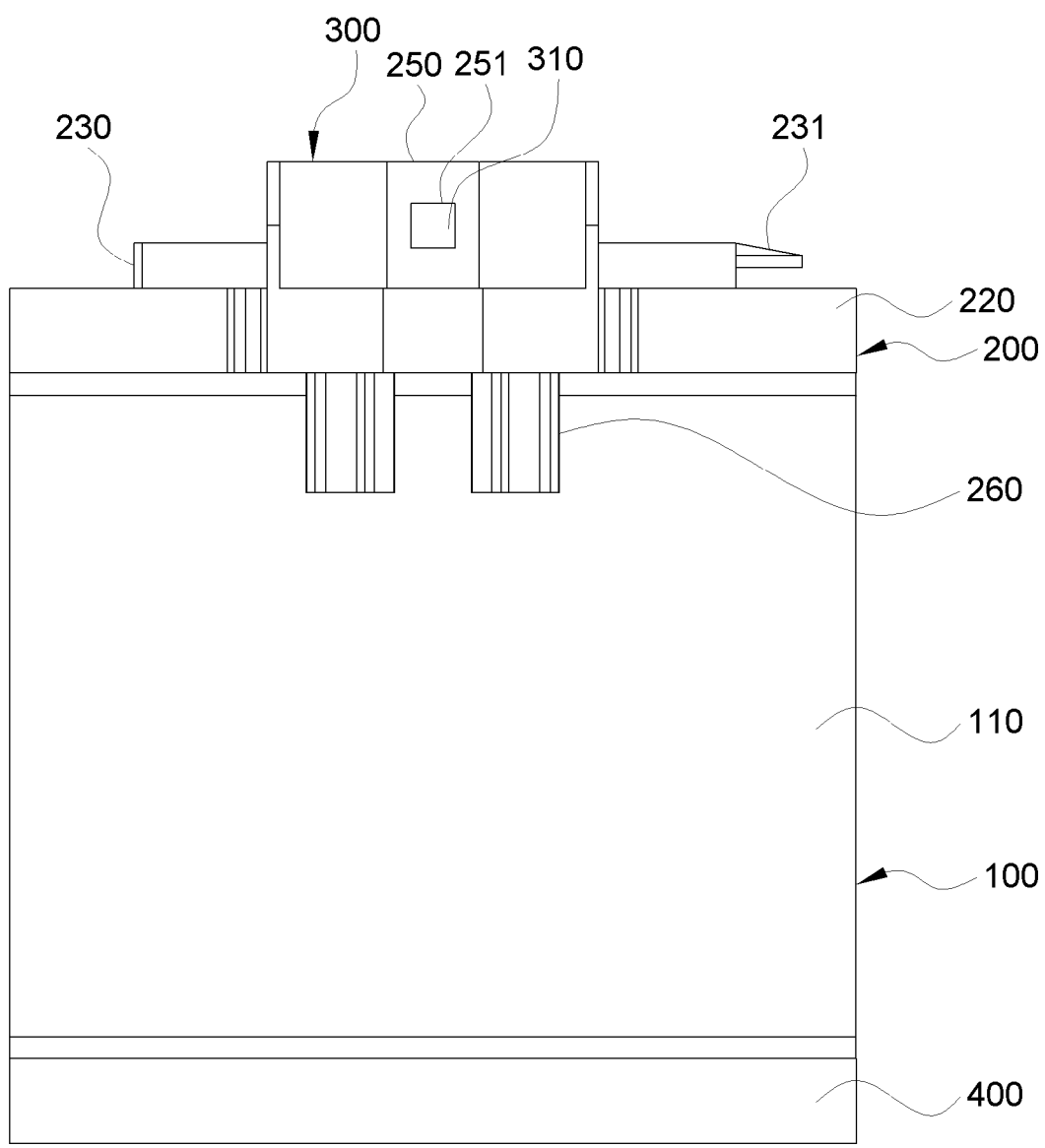
Figure 6:
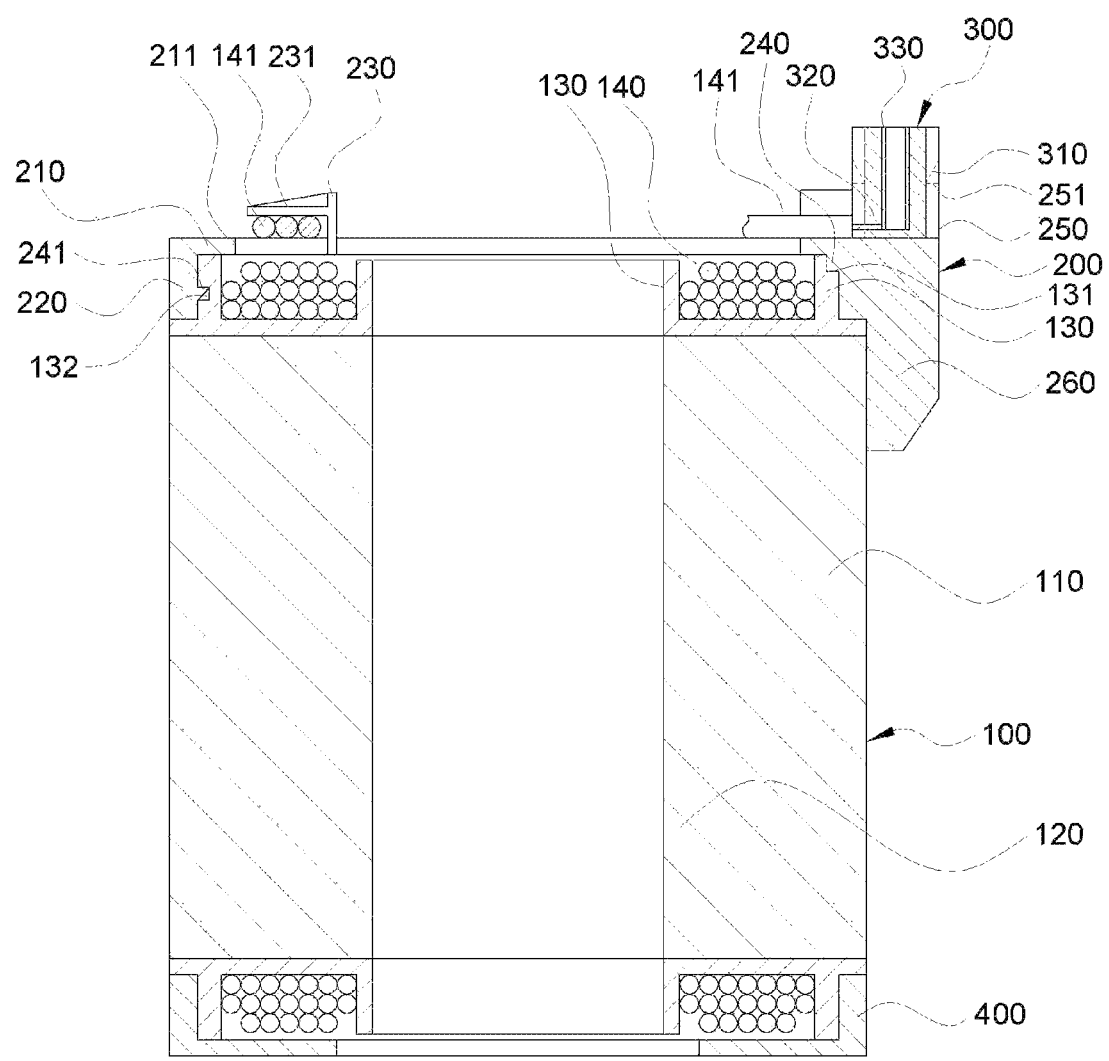
Figure 7:
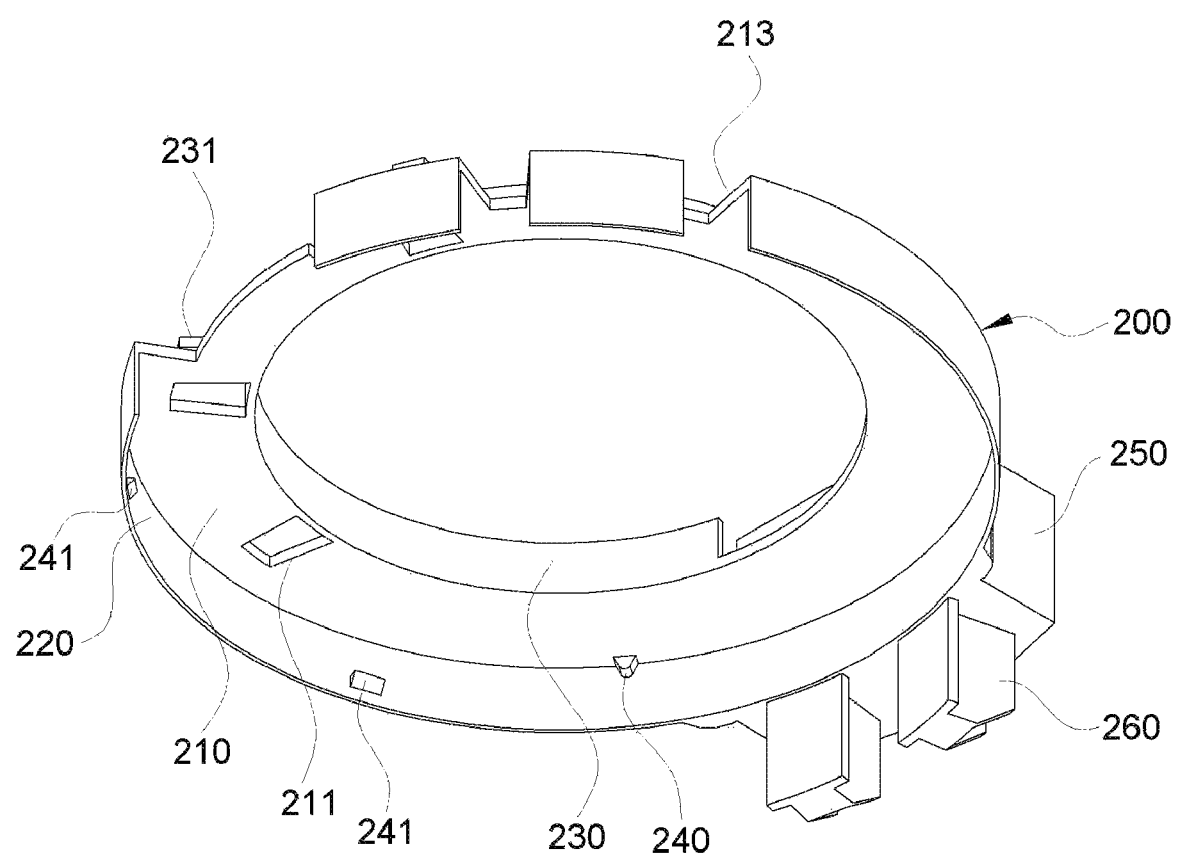
FIG. 7 is a perspective view illustrating a motor cover of the 3-phase connector integrated stator according to an embodiment of the present invention.

FIGS. 2 to 6 are, respectively, an assembled perspective view, an exploded perspective view, a plan view, a rear view, and a cross-sectional view illustrating a 3-phase connector integrated stator according to an embodiment of the present invention, and FIG. 7 is a perspective view illustrating a motor cover of the 3-phase connector integrated stator according to an embodiment of the present invention.

As illustrated in FIGS. 2 to 7, the 3-phase connector integrated stator according to an embodiment of the present invention may be configured to mainly include a stator 100, a motor cover 200, and a 3-phase connector 300.

The stator 100 may be configured to include a core 110, teeth 120, insulators 130, and coils 140. A plurality of teeth 120 may be formed to extend radially inwardly from an inner peripheral surface of the core 110 formed in a cylindrical shape, and may be disposed to be spaced apart from each other by a specific angle in a circumferential direction. In addition, the insulators 130 may be coupled to the core 110 and the teeth 120 in a form in which they surround outer sides of the core 110 the teeth 120, and the coils 140 may be wound on outer sides of the insulators 130 at the respective teeth 120. In addition, 3-phase lead wires 141 connected to the coils 140 may be extended and led in the vicinity of end turns of the coils. Here, the insulator 130 may be formed in a shape in which inner and outer sidewalls thereof are spaced apart from each other and protrude on an inner side and an outer side in a radial direction so that the coil 140 wound on the insulator is not separated, and the outer sidewall may be continuously formed along the circumferential direction at a position corresponding to the core. In addition, the outer sidewall of the insulator 130 may have a shape in which it further protrudes upward than the inner sidewall and the wound coil, and fixing grooves 131 may be concavely formed in an upper surface of the outer sidewall of the insulator 130.

The motor cover 200 may be configured to include an upper plate 210, a peripheral wall 220, and a connector coupling part 250, and may further include a guide plate 230, fixing projections 240, and a support part 260. The upper plate 210 may be formed in a plate-shaped ring shape, and the peripheral wall 220 having a cylindrical shape may be formed to extend downwardly from the outermost side of the upper plate 210 in the radial direction. Therefore, the motor cover 200 may be coupled to the insulator 130 by inserting the outer sidewall of the insulator 130 into an inner side of the peripheral wall 220, and may be coupled to the insulator 130 in a form in which the upper plate 210 of the motor cover 200 comes into contact with and is supported by an upper end of the outer sidewall of the insulator 130. In addition, the connector coupling part 250 may be formed to protrude upwardly from one side of the upper plate 210. In this case, the connector coupling part 250 may be disposed outside an outer peripheral surface of the core 110 of the stator 100 in the radial direction. In addition, the connector coupling part 250 may be a plurality of sidewalls protruding upwardly from the upper plate 210, and the 3-phase connector may be inserted and fixed into an inner side surrounded by the sidewalls. In addition, coupling holes 251 penetrating through both surfaces of the sidewalls in a thickness direction may be formed in the sidewalls, and catching projectors 310 of the 3-phase connector 300 may be caught by and fixed to the coupling holes 215. In addition, the motor cover 200 may have the support part 260 formed to protrude in a central axis direction on an opposite side to the connector coupling part 250, and the support part 260 may be in contact with and be supported by the outer peripheral surface of the core 110 of the stator 100. Therefore, it is possible to prevent the motor cover 200 from being deformed or damaged due to a pressing force when the 3-phase connector 300 is inserted into and coupled to the connector coupling part 250. In addition, the guide plate 230 may be formed to protrude upwardly from an inner end of the upper plate 210 in the radial direction, and fixing tabs 231 may be formed to protrude radially outwardly from an upper end of the guide plate 230. Here, the fixing tabs 231 may be spaced apart from the upper plate 210, and the fixing tabs 231 may be configured in the plural and may be disposed to be spaced apart from each other in the circumferential direction. In addition, lead holes 213 penetrating through upper and lower surfaces of the upper plate 210 may be formed in the upper plate 210, and the lead wires 141 of the coils 140 may be led upwardly of the upper plate 210 through the lead holes 213. In addition, the lead wires 141 may be disposed in the circumferential direction along a space between the upper plate 210, the guide plate 230, and the fixing tabs 231, and end portions of the lead wires 141 may be inserted into the 3-phase connector 300. In addition, through-holes 211 penetrating through the upper and lower surfaces of the upper plate 210 may be formed at positions corresponding to the fixing tabs 231 in the upper plate 210, such that a structure of a mold for forming shapes of the fixing tabs 231 when the motor cover 200 is manufactured through injection molding may be made to be simple. In addition, the fixing projections 240 may protrude from a lower surface of the upper plate 210, and may be inserted into and coupled to the fixing grooves 131 of the insulator 130.

The 3-phase connector 300 may be formed in an approximately rectangular parallelepiped external shape, and may be inserted into and coupled to the connector coupling part 250 from an upper side of the connector coupling part 250. In addition, the 3-phase connector 300 may have the catching projections 310 formed to protrude at positions corresponding to the coupling holes 251 of the connector coupling part 250, and the catching projections 310 may be inserted into and caught by the coupling holes 251 at the time of coupling the 3-phase connector 300 to the connector coupling part 250, such that the 3-phase connector 300 may not be separated from the connector coupling part 250. In addition, the 3-phase connector 300 may have coil lead wire coupling parts 320 formed in an inner surface thereof in the radial direction, and the end portions of the lead wires 141 may be inserted and coupled into and be electrically connected to the coil lead wire coupling parts 320. In addition, the 3-phase connector 300 may have connector pin coupling parts 330 formed in an upper surface thereof, and the connector pin coupling parts 330 may be electrically connected to the coil lead wire coupling parts 320 In addition, although not illustrated, connector pins for connection with an inverter unit may be inserted into and coupled to the connector pin coupling parts 330, and the connector pins may be coupled to a housing through a sealing part.

Therefore, in the 3-phase connector integrated stator according to the present invention, the 3-phase connector may be easily assembled to the stator, and there may be a clearance between the stator and the motor cover and a clearance between the connector coupling part and the 3-phase connector, and thus, a position of the 3-phase connector is slightly adjustable, such that the connector pins may also be easily assembled to the 3-phase connector.

In addition, the motor cover 200 may be coupled to an upper side of the stator 100, and a lower cover 400 may be coupled to a lower side of the stator 100.

In addition, the fixing grooves 131 of the insulator 130 may be formed in a shape in which they are connected to an upper surface and an outer side surface in the radial direction at outer peripheral edge of an upper end of the insulator 130, and the fixing projections 240 of the motor cover 200 may be formed to protrude in a shape in which they correspond to the fixing grooves 131 on an inner side where the upper plate 210 and the peripheral wall 220 meet. Thus, the fixing protrusion 240 may be easily inserted into and coupled to the fixing groove 131. In addition, since the fixing projections 240 are connected to both the upper plate 210 and the peripheral wall 220, the fixing projections 240 are more firmly coupled to the motor cover 200, and thus, damage to the fixing projections may be prevented. Here, in a state in which the motor cover 200 is coupled to the insulator 130 of the stator 100 by the fixing projections 240 and the fixing grooves 131, the rotation of the motor cover 200 and a clearance and a shake of the motor cover 200 in a direction perpendicular to the central axis direction may be prevented.

In addition, the fixing projection 240 may be formed in a shape in which a width thereof gradually decreases toward a direction in which it is inserted into the fixing groove 131, and the fixing groove 131 of the motor cover 200 may be formed in a shape in which it corresponds to the fixing projection 240. Therefore, the motor cover 200 may be easily coupled to the insulator 130.

In addition, the insulator 130 of the stator 100 may have catching grooves 132 formed in a side surface thereof, the motor cover 200 may have catching projections 241 protruding on an inner side surface of the peripheral wall 220, and the catching projections 241 may be inserted into and coupled to the catching grooves 132. Therefore, in a state in which the motor cover 200 is coupled to the insulator 130, the motor cover 200 may not easily fall off toward an opposite direction to a direction in which it is coupled to the insulator 130 in the central axis direction.

In addition, the motor cover 200 may have a plurality of cable guide walls 252 formed to protrude from an inner side surface of the connector coupling part 250 in the radial direction, and each of the end portions of the lead wires 141 of 3-phase coils of the stator 100 may be inserted between a pair of cable guide walls 252. That is, a distal end of the end portion of the lead wire 141 may be inserted and coupled into and be electrically connected to the coil lead wire coupling part 320 of the 3-phase connector 300 in a state in which a coating is removed. In this case, the end portion of the lead wire 141 is inserted between the pair of cable guide walls 252, and thus, insulation of the lead wire 141 may be further improved. Here, the cable guide walls 252 may serve to hold the end portion of the lead wire 141 to prevent a strand of the lead wire 141 from being cut at a portion where the end portion of the lead wire 141 is connected to the coil lead wire coupling part 320 of the 3-phase connector 300. In addition, a pair of cable guide walls 252 may form one set, and three sets of cable guide walls 252 may be formed to correspond to the respective lead wires 141 of the 3-phase coils.

Figure 8:
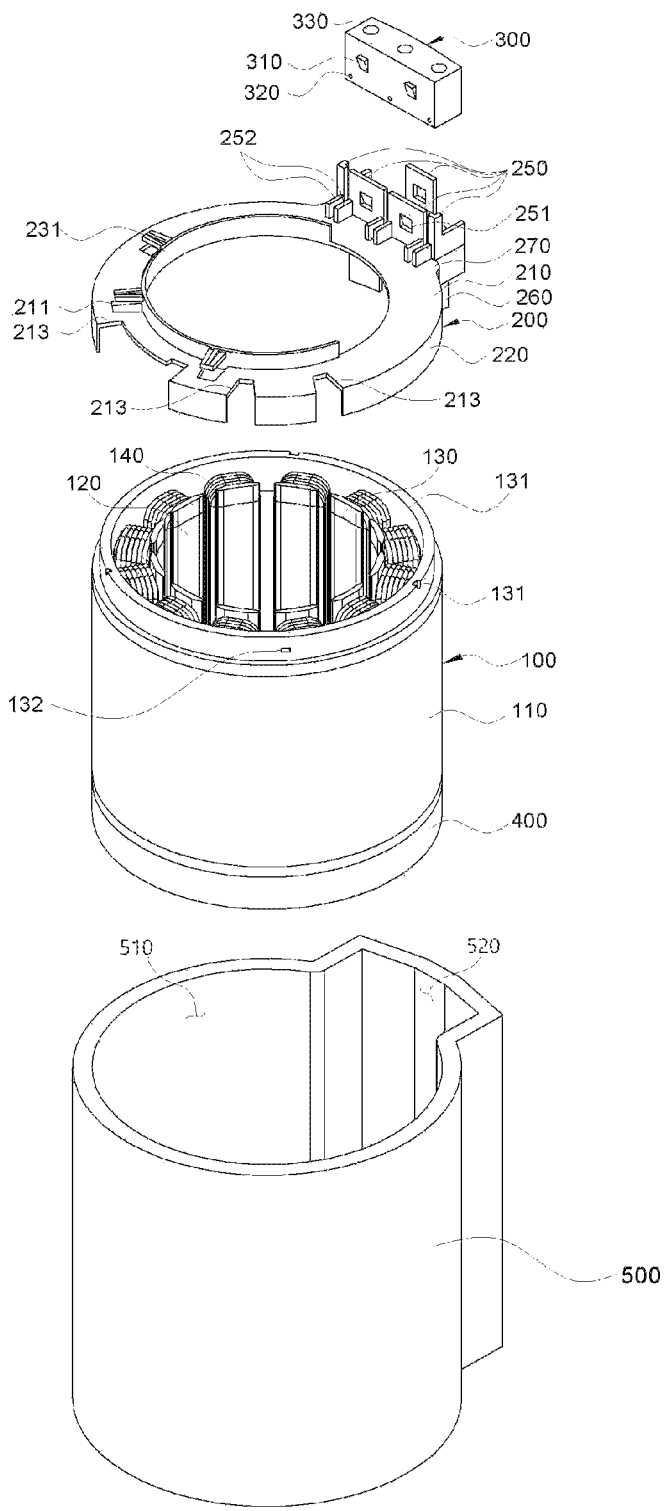
FIGS. 8 and 9 are, respectively, an exploded perspective view and a plan view illustrating a compressor including the 3-phase connector integrated stator and a housing according to an embodiment of the present invention.
Figure 9:
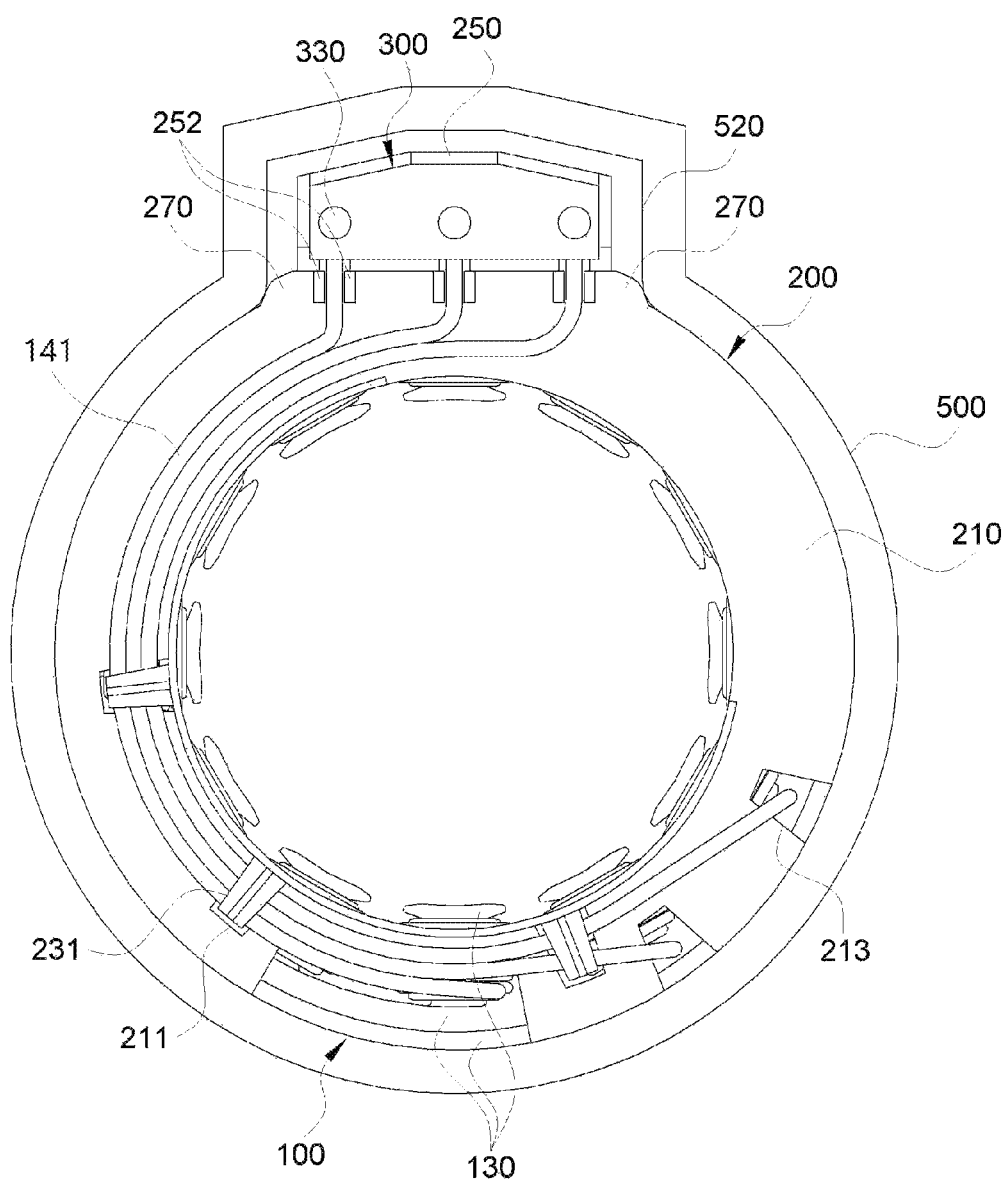

FIGS. 8 and 9 are, respectively, an exploded perspective view and a plan view illustrating a compressor including the 3-phase connector integrated stator and a housing according to an embodiment of the present invention.

As illustrated in FIGS. 8 and 9, an electric compressor including the 3-phase connector integrated stator according to the present invention may include the 3-phase connector integrated stator and a housing 500 into which the 3-phase connector integrated stator is inserted and housed. The housing 500 may be formed in a shape of a container of which an upper side is opened, and the housing 500 may be formed in a shape in which a guide groove 520 is connected to a housing part 510, which is an internal space into which the stator 100 is inserted. Here, the guide groove 520 is a space into which the connector coupling part 250 of the motor cover 200 is inserted. In addition, the motor cover 200 may have guide parts 270 protruding radially outwardly from an outer side surface of the peripheral wall 220, and the guide parts 270 may be inserted along the guide groove 520 of the housing 500. In addition, the guide parts 270 of the motor cover 200 may be formed at two places adjacent to both sides of the connector coupling part 250, and an outer distance of a pair of guide parts 270 in a width direction may be greater than a width of the connector coupling part 250. Therefore, the connector coupling part 250 may be disposed to be spaced apart from the guide groove 520 of the housing 500 by the pair of guide parts 270. Accordingly, when the 3-phase connector integrated stator is inserted into and assembled to the housing 500, assemblability may be improved. In addition, a direct coupling force or vibrations may not be transferred to the connector coupling part 250, and thus, damage at the time of assembling the electric compressor may be prevented, and durability at the time of using the electric compressor may be increased.

In the 3-phase connector integrated stator and the electric compressor including the same according to the present invention, the 3-phase connector may be easily assembled and coupled to the stator, and a position of the 3-phase connector may be adjusted, such that the connector pins may be easily assembled to the 3-phase connector.

The present invention is not limited to the embodiments described above, and may be applied to various fields. In addition, the present invention may be variously modified by those skilled in the art to which the present invention pertains without departing from the gist of the present invention claimed in the claims.

What is claimed is:

1. A 3-phase connector integrated stator comprising:
a stator including a plurality of teeth formed to extend from a cylindrical core, insulators coupled to the core and the teeth so as to surround outer sides of the core and the teeth, and coils wound on outer sides of the insulators at the respective teeth;
a motor cover coupled to an upper insulator in a central axis direction of the stator and having a connector coupling part protruding upwardly in the central axis direction of the stator from an upper plate; and
a 3-phase connector inserted into and coupled to the connector coupling part of the motor cover and having connection pins connected to 3-phase coils of the stator,
wherein the connector coupling part of the motor cover is a plurality of sidewalls formed at two or more places with the 3-phase connector interposed therebetween and each having coupling holes formed to penetrate through both surfaces thereof, and
wherein the 3-phase connector has catching projections formed to be inserted into and caught by the coupling holes.

2. The 3-phase connector integrated stator of claim 1, wherein the connector coupling part of the motor cover and the 3-phase connector are disposed outside the stator in a radial direction.

3. The 3-phase connector integrated stator of claim 1, wherein the motor cover has a support part formed to protrude in the central axis direction on an opposite side to the connector coupling part, and the support part is in contact with and is supported by an outer peripheral surface of the stator.

4. The 3-phase connector integrated stator of claim 1, wherein the motor cover has a guide plate formed to protrude upwardly in the central axis direction of the stator from an inner end of the upper plate in a radial direction.

5. The 3-phase connector integrated stator of claim 4, wherein the motor cover has fixing tabs formed to protrude radially outwardly from an upper end of the guide plate in order to fix lead wires of the 3-phase coils.

6. The 3-phase connector integrated stator of claim 1, wherein through-holes penetrating through the upper and lower surfaces of the upper plate are formed at positions corresponding to the fixing tabs in the upper plate of the motor cover.

7. The 3-phase connector integrated stator of claim 1, wherein the 3-phase connector has coil lead wire coupling parts formed in an inner surface thereof in a radial direction, and has connector pin coupling parts formed in an upper surface thereof.

8. The 3-phase connector integrated stator of claim 1, wherein the insulator of the stator has fixing grooves formed in an upper surface thereof, the motor cover has fixing projections protruding from a lower surface thereof, and the fixing projections are inserted into and coupled to the fixing grooves.

9. The 3-phase connector integrated stator of claim 8, wherein the fixing grooves are formed in a shape in which they are connected to an upper surface and an outer side surface in a radial direction at outer peripheral edge of an upper end of the insulator, and
the fixing projections are formed to protrude in a shape in which they correspond to the fixing grooves on an inner side where the upper plate and a peripheral wall of the motor cover meet.

10. The 3-phase connector integrated stator of claim 8, wherein the fixing projection is formed in a shape in which a width thereof gradually decreases toward a direction in which it is inserted into the fixing groove.

11. The 3-phase connector integrated stator of claim 1, wherein the insulator of the stator has catching grooves formed in a side surface thereof, the motor cover has catching projections protruding on a side surface thereof, and the catching projections are inserted into and coupled to the catching grooves.

12. The 3-phase connector integrated stator of claim 1, wherein lead holes penetrating through upper and lower surfaces of the upper plate are formed in the upper plate of the motor cover.

13. The 3-phase connector integrated stator of claim 1, wherein cable guide walls are formed to protrude from an inner side surface of the connector coupling part in a radial direction, and
    end portions of lead wires of the 3-phase coils of the stator are inserted between the cable guide walls.

14. A compressor comprising:
    the 3-phase connector integrated stator of claim 1; and
    a housing into which the 3-phase connector-integrated stator is inserted and housed.

15. The compressor of claim 14, wherein guide parts are formed to protrude radially outwardly from an outer side surface of the motor cover of the 3-phase connector integrated stator,
    a guide groove which is connected to a housing part and into which the connector coupling part of the motor cover is inserted is formed in the housing, the housing part being an internal space into which the stator is inserted, and
    the guide parts are inserted along and coupled to the guide groove.

16. The compressor of claim 14, wherein the connector coupling part of the motor cover is disposed to be spaced apart from the guide groove of the housing.

* * * * *